(12) United States Patent
Baba et al.

(10) Patent No.: US 7,879,239 B2
(45) Date of Patent: Feb. 1, 2011

(54) WASTEWATER TREATMENT METHOD USING IMMOBILIZED CARRIER

(75) Inventors: Yasuhiro Baba, Osaka (JP); Hiroaki Fujii, Kurashiki (JP); Hidehiko Okabe, Saijo (JP); Goro Kobayashi, Chuo-ku (JP); Tsutomu Miura, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 366 days.

(21) Appl. No.: 12/161,178

(22) PCT Filed: Jan. 24, 2007

(86) PCT No.: PCT/JP2007/000028
§ 371 (c)(1), (2), (4) Date: Jul. 17, 2008

(87) PCT Pub. No.: WO2007/086240
PCT Pub. Date: Aug. 2, 2007

(65) Prior Publication Data
US 2010/0219126 A1    Sep. 2, 2010

(30) Foreign Application Priority Data
Jan. 25, 2006  (JP)  ............................. 2006-016426
Sep. 14, 2006  (JP)  ............................. 2006-249744

(51) Int. Cl.
*C02F 3/00* (2006.01)
(52) U.S. Cl. ...................................... 210/616; 210/620
(58) Field of Classification Search ................. 210/616, 210/620
See application file for complete search history.

(56) References Cited

U.S. PATENT DOCUMENTS 6,107,067 A * 8/2000 Miller et al. ................. 435/176

(Continued)

FOREIGN PATENT DOCUMENTS

CN    1304885 A    7/2001

(Continued)

OTHER PUBLICATIONS 5-tei, Kougai-bousi no Gijutsu to Houki (Suishitsu-hen) (5th edition, Technology and Regulation for Pollution Prevention (Water Quality Volume)); pp. 197 (2001).

(Continued)

*Primary Examiner*—Chester T Barry
(74) *Attorney, Agent, or Firm*—Oblon, Spivak. McClelland, Maier & Neustadt, L.L.P.

(57)    ABSTRACT

To provide an inexpensive wastewater treatment method which facilitates downsizing of tanks and requires less withdrawal of an excessive sludge, the use is made of an aeration tank 1 in which wastewater is contacted with a particulate carrier under an aerobic condition, and a total oxidization tank 3 in which the volume of a sludge generated in the aeration tank 1 is reduced under an aerobic condition, a coefficient of self-oxidization of the sludge flowing into the total oxidization tank 3 is set to 0.05 (per day), and the method includes a step of adding a coagulant to the total oxidization tank 3 for the purpose of improving the solid-liquid separating characteristic of the sludge within the total oxidization tank.

6 Claims, 5 Drawing Sheets

U.S. PATENT DOCUMENTS

| | | | |
|---|---|---|---|
| 7,407,582 B2 * | 8/2008 | Sun | 210/607 |
| 2004/0134856 A1 | 7/2004 | Fujii et al. | |

FOREIGN PATENT DOCUMENTS

| | | |
|---|---|---|
| EP | 1 101 738 A2 | 5/2001 |
| EP | 1 101 738 A3 | 5/2001 |
| JP | 63 77595 | 4/1988 |
| JP | 7 155784 | 6/1995 |
| JP | 2000-263093 | 9/2000 |
| JP | 2001 205290 | 7/2001 |
| JP | 2001 347284 | 12/2001 |
| JP | 2002 59185 | 2/2002 |
| JP | 2002-126796 | 5/2002 |
| JP | 2002-191942 | 7/2002 |
| JP | 2004 216207 | 8/2004 |
| JP | 2005 211879 | 8/2005 |

OTHER PUBLICATIONS

Kankyo-Hozen-Haikibutsu-Shori (Environment Conservation and Waste Processing: Guide to All Technologies); pp. 69-72 (2002).

U.S. Appl. No. 11/632,482, filed Jan. 16, 2007, Baba, et al.

Office Action issued Nov. 9, 2010, Chinese Patent No. 200780003424.1, filed Jan. 24, 2007 ( with partial English Translation of Office Action).

* cited by examiner

WASTEWATER TREATMENT METHOD USING IMMOBILIZED CARRIER

BACKGROUND OF THE INVENTION 1. (Field of the Invention)

The present invention relates to a wastewater treatment method relying on a high level wastewater treatment technology, in which an immobilized carrier is used.

2. (Description of the Prior Art)

Hitherto, the wastewater treatment method relying on the activated sludge process has been employed mainly. According to the wastewater treatment method relying on the activated sludge process, the wastewater treatment system can be steadily operated under a condition, in which the BOD volume load is within the range of about 0.3 to 0.8 kg/cm$^3$ per day, when wastewater is brought into contact with an activated sludge under an aerobic within an aeration tank and is then sedimented within a sedimentation tank while the sludge is in part returned to the aeration tank and is in part withdrawn as an excess sludge. (See, for example, the Non-patent Document 1 below.) On the other hand, a carrier capable of holding microorganisms in a high density has now been developed and, by using the carrier, high BOD volume load of 2 to 5 kg/m$^3$ per day can be imposed enough to allow the aeration tank to be downsized. (See, for example, the Non-patent Document 2 below.)

Non-patent Document 1

"5-tei, Kougai-bousi no Gijutsu to Houki (Suishitsu-hen) (5th Edition, Technology and Regulation for Pollution Prevention (Water Quality Volume))" edited by Kougai-boushi Gijutsu to Houki-hennshu Iin-kai and published from Sangyo Kankyo Kannri Kyokai, 7th-ed, Jun. 12, 2001, pp 197.

Non-patent Document 2

"Kankyo-hozen•Haikibutsu-shori: Sougougijutsu Gaido (Environment Conservation and Waste Processing: Guide to All Technologies)", Kogyo Chousa-kai, Feb. 12, 2002, pp 70.

Patent Document 1

JP Laid-open Patent Publication No. 2001-205290, published Jul. 31, 2001

Patent Document 2

JP Laid-open Patent Publication No. 2001-347284, published Dec. 18, 2001

SUMMARY OF THE INVENTION (Problems to be Solved by the Invention)

With the conventional activated sludge process, the system must be operated with the BOD volume load of about 0.3 to 0.8 kg/cm$^3$ per day, requiring the use of a large aeration tank. In the system operation according to the activated sludge process under such a high BOD volume load, not only does the treatment become insufficient, but the settleability decreases, accompanied by difficulty in separating the sludge in the sedimentation tank in the subsequent stage to such an extent as to result in difficulty in operating the system steadily. Also with the conventional activated sludge process, about 50% of the removed BOD is said to transform into sludge, and such a so-called excess sludge is required to be finally disposed in such a way as to be reclaimed in lands or incinerated after having been withdrawn out of the system and subsequently dehydrated. It is theoretically possible to configure a system that generates no excess sludge by establishing a totally oxidized condition, in which the rate of growth of the sludge and the rate of self-oxidization of the sludge are counterbalanced with each other, instead of withdrawing the sludge. However, establishment of the totally oxidized condition within the activated sludge tank results in considerable increase of MLSS within the aeration tank, raising a problem in which a considerably large activated sludge tank must be provided for. In such case, there is another problem in which the sludge would be so refined as to make it difficult to separate the sludge by spontaneous sedimentation.

In view of the incapability of any treated water being drained unless precipitation of the sludge is achieved, the system to improve the sludge settleability is suggested, in which a load is applied to the activated sludge so that the BOD sludge load within the activated sludge tank may fall within the range of 0.08 to 0.2 kg-BOD/kg-ss per day. However, this method, in which the load is applied, has been found difficult in reducing the amount of the excess sludge withdrawn. (See, for example, the Patent Documents 1 and 2 above.)

The present invention has been devised to alleviate the foregoing problems and inconveniences and is intended to provide an inexpensive wastewater treatment method, in which the tanks can be downsized and withdrawal of the excess sludge can be minimized.

(Means for Solving the Problems)

In order to accomplish the foregoing object, the wastewater treatment method of the present invention makes use of an aeration tank in which wastewater is contacted with a particulate carrier under an aerobic condition, a total oxidization tank in which the volume of a sludge developed within the aeration tank is reduced, and a solid-liquid separation equipment for the sludge within the total oxidization tank and includes steps of setting the coefficient of self-oxidization of the sludge flowing into the total oxidization tank to 0.05 (per day) or larger and adding a coagulant to the total oxidization tank to improve the solid-liquid separability of the sludge within the total oxidization tank.

When the wastewater is aerated at a low sludge load within the total oxidization tank, the rate of growth of the sludge and the rate of self-oxidization of the sludge can be counterbalanced with each other to thereby avoid increase of the sludge. However, since the aeration tank will have an increased capacity where the activated sludge is employed in the aeration tank and, also, since the coefficient of self-oxidization of the sludge flowing into the total oxidization tank is extremely small, the total oxidization tank must have a capacity that is twice to six times that required when the carrier is employed in the aeration tank, particularly where an attempt is made to counterbalance the rate of growth of the sludge and the rate of self-oxidization of the sludge with each other. The reason for the coefficient of self-oxidization of the activated sludge being low appears, inter alia, that the activated sludge contains protozoa having a smaller coefficient of self-oxidization than that of bacteria and that a sticky material derived to coagulate bacteria is composed of a polymer having a small coefficient of self-oxidization. Although when the carrier is employed in such an aeration tank, the aeration tank and the total oxidization tank can be downsized, a problem tends to occur that difficulty is encountered in separating the sludge within the sedimentation tank or the membrane filtration apparatus because the sludge developed within the aeration tank contains a small amount of protozoa and sticky material so that they are dispersed without being spontaneously sedimented. Although in the wastewater treatment, addition of the coagulant to improve the solid-liquid separability itself has been well known, the inventors of the present invention have found that the addition of a predetermined amount of the coagulant during the practice of the wastewater treatment under a specific condition can lead to not only downsizing of the equipment and improvement of the solid-liquid separability, but also to a considerable reduction in amount of the sludge withdrawn simultaneously therewith and the present invention is based on this finding. It is indeed surprising that as compared with the conventional technique of adding the coagulant hitherto known in the art, the present invention is effective to achieve the intended object with an extremely small amount of the coagulant added.

According to the present invention, the tanks can be downsized and, yet, the amount of the excess sludge withdrawn can be very small, allowing the wastewater to be treated at a low cost.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
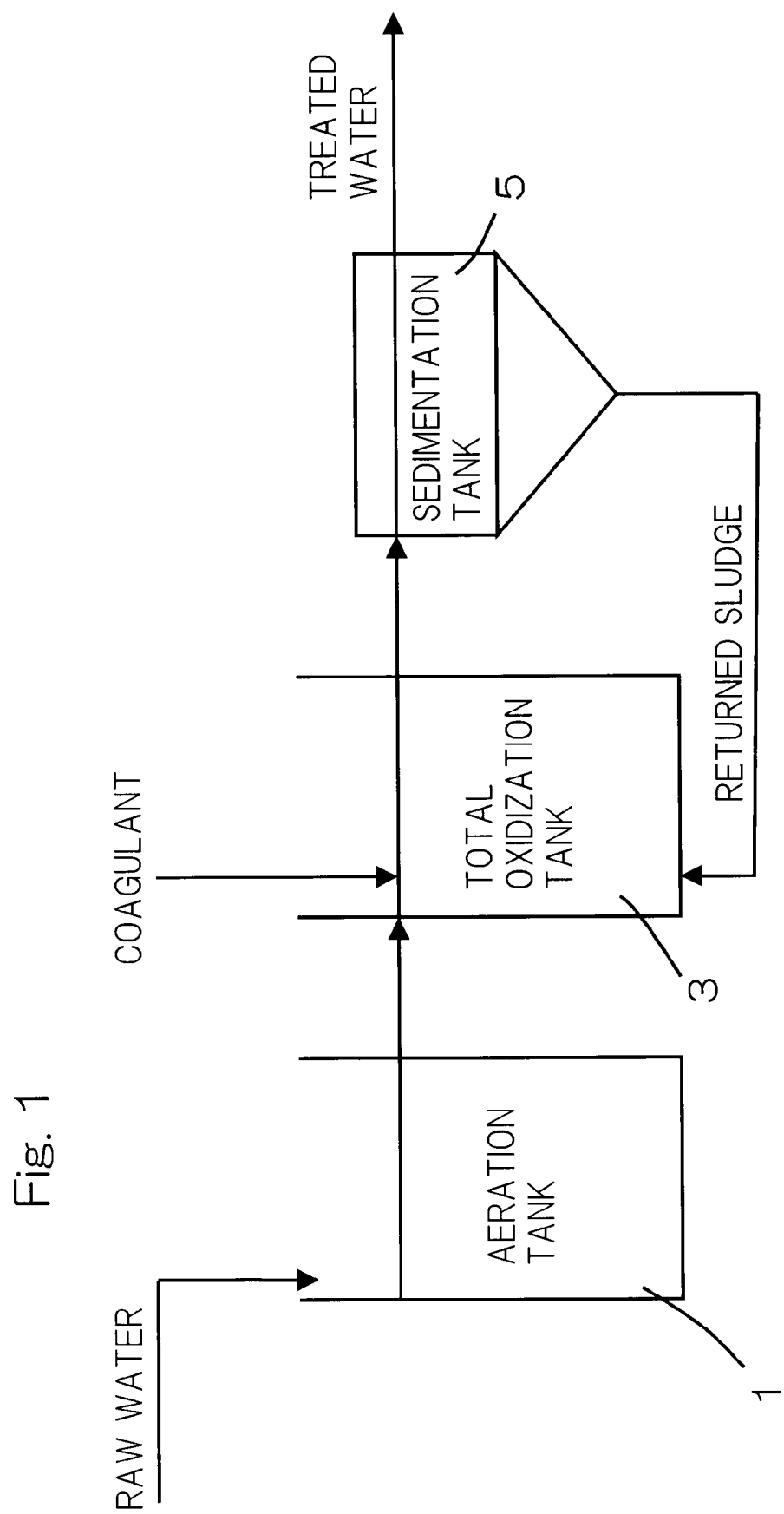
FIG. 1 is a diagram schematically showing the flow for removal of BOD employed in any one of Examples 1 and 4 to 6 and Comparative Examples 1, 2 and 5 to 7.

Essential components of the present invention are (1) an aeration tank, (2) a coefficient of self-oxidization, (3) a total oxidization tank, (4) a coagulant and (5) a solid-liquid separation equipment, which will be individually described in detail.

(1) Aeration Tank:

The aeration tank employed in the practice of the present invention is required to conduct an aeration treatment so that a sludge flowing from the aeration tank into the total oxidization tank has a coefficient of self-oxidization that is 0.05 (per day) or larger. While methods necessary to secure discharged water of a kind, in which the coefficient of self-oxidization of the sludge referred to above is 0.05 (per day) or larger, will be described in detail later, the present invention requires at least an addition of a carrier into the aeration tank of the present invention.

Where no carrier is added to the aeration tank, the capacity of the aeration tank is required to be significantly large, as hereinabove described, because the aeration tank is operated under the activated sludge process. Also, since the activated sludge has a coefficient of self-oxidization which is smaller than that where the carrier is employed in the aeration tank, it is necessary to increase the capacity of the total oxidization tank. Although the manner of use of the carrier within the aeration tank may be either a fluidized bed or a fixed bed, the fluidized bed is preferred in terms of process efficiency. The carrier to be added to the aeration tank may be of any kind well known in the art, and a carrier selected from the group consisting of a gel carrier, a plastic carrier and a fibrous carrier or a combination of two or more of them is preferably employed. In particular, a gel carrier of acetalized polyvinyl alcohol is preferred because of a high processing performance and fluidity. The filling factor of the carrier is, in the case of the fluidized bed, preferably within the range of 5 to 50% and, more preferably, within the range of 10 to 30% relative to the capacity of the tank in terms of process efficiency and fluidity.

(2) Coefficient of Self-oxidization:

The coefficient of self-oxidization is a coefficient that is used in calculating the amount of sludge produced and is a proportion of the sludge reduced by self-oxidization resulting from cannibalism of the sludge per day relative to the total amount of the sludge within the total oxidization tank. In the case of the activated sludge, the coefficient of self-oxidization is generally about 0.02 (per day) although it may vary depending on, for example, the operating condition. Where the carrier is employed in the aeration tank, the sludge tends to be reduced as compared with that of the activated sludge, generally having a coefficient of self-oxidization within the range of 0.05 to 0.1 (per day).

The coefficient of self-oxidization is determined by injecting an activated sludge or a sludge, of a predetermined sludge concentration, within the aeration tank in which the carrier is used, into a graduated cylinder of 1 L in capacity, measuring the sludge concentration each time a predetermined length of time is passed under an aerobic condition, and dividing the amount of the sludge reduced per length of time passed, by the initial mount of the sludge.

The coefficient of self-oxidization of the sludge contained in a water discharged from the aeration tank varies depending on the property of the water so discharged, the BOD volume load of the aeration tank, the kind and property of the carrier used, temperature, pH and so on. So long as the kind and property of the carrier are concerned, it has been found that it tends to vary considerably depending on the pore size of pores present in the surface of the carrier. With respect to the pore size of the pores present in the surface of the carrier, the pore size is defined as d um or smaller when the area of pores of a specific pore size (d μm) or smaller, measured by electron microscopic observation, occupies 70% or more of the total surface area of the pores. The water to be discharged, which has a coefficient of self-oxidization as defined in the present invention, can be determined by evaluation using carriers having respective pore sizes of not larger than 10 μm, not larger than 20 μm, not larger than 50 μm and not larger than 100 μm during pilot experiments conducted under a specific BOD volume load. In the practice of the present invention, the use of the carrier having a pore size not larger than 50 μm and, more preferably not larger than 20 μm, is preferred. The reason therefor is not clear, but it appears that the inhabitancy of microbes that adhere to the carrier is closely related.

With respect to the BOD volume load (often expressed by s-BOD volume load) of the aeration tank, it has been found that where a proper carrier is employed, there is a tendency that the coefficient of self-oxidization increases with increase of the BOD volume load. So long as the BOD volume load is concerned, it is preferred that in terms of stability of the tank, the tank is operated under the BOD volume load of 2 to 3 (kg/m$^3$ per day). As a result of the pilot experiments conducted under the above described condition, it is preferred that in the event that the coefficient of self-oxidization does not fall within the range specified by the present invention, the tank is sequentially operated under conditions of 3 to 4, 4 to 5 and larger than 5 (kg/m$^3$ per day).

With respect to the temperature, the temperature with the ranges of 3 to 40° C., preferably 10 to 35° C. and more preferably 20 to 30 ° C. is employed in terms of the biological reactivity. Also, with respect to the pH value, in terms of the biological reactivity, the pH value within the range of 3 to 9, preferably 4 to 8, more preferably 6 to 8 and most preferably 6 to 7 can be suitably employed.

Methods used to increase the coefficient of self-oxidization of the sludge contained in the water discharged from the aeration tank to a value equal to or larger than 0.05 (per day) is affected by the property of the wastewater to be treated and, therefore, in the practice of the wastewater treatment in accordance with the present invention, a proper condition under which a given wastewater treatment is carried out varies. Accordingly, pilot experiments have to be carried out so that the BOD volume load of the aeration tank, the kind of the carrier to be used, the pore size of pores present particularly in the surface of the carrier, temperature and pH value should be adjusted in dependence on the property of the wastewater to be treated.

(3) Total Oxidization Tank:

The concentration of the sludge within the total oxidization tank varies according to the mode of solid-liquid separation that takes place in the subsequent stage. In the case of the solid-liquid separation taking place within the sedimentation tank, the concentration of the sludge within the total oxidization tank is, although not specifically limited thereto, preferably within the range of 3000 to 6000 mg/L and more preferably higher than 6000 mg/L. On the other hand, in the case of the solid-liquid separation taking place by means of a filtering system such as, for example, a membrane filtration or a sand filtration, the concentration of the sludge within the total oxidization tank is preferably within the range of 6000 to 10000 mg/L and more preferably higher than 10000 mg/L in order to reduce the capacity of the total oxidization tank. In the practice of the present invention, in the total oxidization tank, the rate of growth of the sludge and the rate of self-oxidization of the sludge are counterbalanced with each other by allowing the sludge to be aerated under a low sludge load to thereby prevent proliferation of the sludge and, hence, the wastewater treatment with minimized withdrawal of the excess sludge can be accomplished. It is to be noted that the condition in which the withdrawal of the excess sludge is minimized means the condition in which the MLSS within the total oxidization tank is substantially constant, the top interface of the sludge in the sedimentation tank to which the water to be discharged is supplied from the total oxidization tank, does not ascend substantially and the withdrawal of the sludge need not be continued more than one day. By way of example, if the amount of the sludge that increases per day is smaller than 1% of the total amount of the sludge within the total oxidization tank, it may be said that the withdrawal of the excess sludge is minimal.

(4) Coagulant:

The coagulant employed in the practice of the present invention is intended to improve the sedimentation of the sludge produced within the aeration tank and also to increase the sludge concentration within the total oxidization tank. The addition of the coagulant is carried out in one of two ways in which a coagulant reacting tank is provided at a stage between the aeration tank and the total oxidization tank or between the total oxidization tank and the solid-liquid separation equipment so that the coagulant is added directly into the coagulant reacting tank, or, the coagulant is added directly into the total oxidization tank. The amount of the coagulant to be added is preferably of a value enough to allow the SVI of the sludge within the total oxidization tank to attain not larger than 200 ml/g.

(5) Solid-Liquid Separation Equipment:

The solid-liquid separation equipment employed in the practice of the present invention may be a sedimentation tank or a filtering equipment such as, for example, a membrane filter, a sand filter, or a fibrous filter, all of which may be of a type well known in the art. Where the sedimentation tank is used as the solid-liquid separation equipment, the operating condition including, for example, surface loading and retention time may be identical with that employed in the practice of the conventional activated sludge process.

One example of the flow of the wastewater treatment in accordance with the present invention is shown in FIG. 1, which is intended for the removal of BOD. In this system, in order to render the aeration tank 1 to be as compact as possible, the soluble BOD volume load in the aeration tank 1 is preferably equal to or higher than 1 kg/m$^3$ per day. The term "soluble BOD" referred to above is represented by the BOD obtained by measuring a filtrate after filtration with a membrane filter having a pore size of 0.45 μm and means BOD with microbes removed. (The soluble BOD may be often expressed by "s-BOD" in the subsequent description.) The higher the soluble BOD volume load, the more compact the aeration tank 1 can be assembled. By suitably selecting the kind of and the filling factor of the carrier, the tank can be operated under a load of 2 kg/(m$^3$ per day) or higher or a load of 5 kg/(m$^3$ per day) or higher. The throughput of the soluble BOD within the aeration tank 1 is preferably equal to or higher than 90%. The BOD sludge load in the total oxidization tank 3, in which the sludge can be reduced in volume under an aerobic condition is preferably equal to or lower than 0.05 kg-BOD/(kg-SS per day).

In the present invention, the wastewater treated under the aerobic condition within the aeration tank 1 is introduced into the total oxidization tank 3 and the coagulant is then added to such total oxidization tank 3, in which any coagulant that can be employed in the standard water treatment can be employed. By way of example, for an in organic coagulant that may be employed in the practice of the present invention, aluminum sulfate, polyaluminum chloride (PAC), ferrous sulfate, ferric sulfate, ferric chloride, chlorinated copperas, sodium aluminate, ammonium alum, potassium alum, calcium hydroxide, calcium oxide, soda ash, sodium carbonate, magnesium oxide, and an iron-silica polymer can be enumerated.

For an organic (polymer) coagulant that may be employed in the practice of the present invention, polyacrylamide, sodium alginate, carboxymethyl cellulose sodium salt, sodium polyacrylate, a copolymer of maleic acid, water soluble aniline, polythiourea, polyethyleneimine, quaternary ammonium salt, polyvinyl pyridines, polyoxyethylene, and caustic starch can be enumerated. The coagulant consisting of two or more of those substances can also be employed in the practice of the present invention.

With respect to the amount of the coagulant to be added, no coagulating effect will be available where the amount thereof is small and, where the amount thereof is large, solid component will form an excess sludge, eventually resulting withdrawal of a substantial amount of sludge. By way of example, in the system in which the sedimentation tank 5 is used, the coagulant is added until the SVI, which is an index of sedimentation of the sludge, attains a value equal to or smaller than 200 ml/g. The addition of the coagulant can be performed according to either an intermittent addition method, in which addition of the coagulant continues up until the sedimentation of the sludge can be improved, followed by refrainment of the addition up until the sedimentation of the sludge becomes worse or a continuous addition method in which a small amount of the coagulant is constantly added.

Since some coagulant requires a specific pH value and a temperature range to be observed for coagulation and may bring about a change in pH value when added. Accordingly, it is preferred to perform a water quality control to adjust the pH value for coagulation, as required.

When microbes are allowed to undergo self-oxidization within the total oxidation tank 3, nitrate nitrogen and/or nitrite nitrogen derived from microbe are generated and are then carried off by a treated sewage from the sedimentation tank 5. In order to reduce the amount of the nitrate nitrogen and/or nitrite nitrogen, where the wastewater treatment within the aeration tank 1 is for the purpose of removal of the BOD, a denitrifying tank and a nitrifying tank may be employed in the stage preceding or subsequent to the total oxidation tank 3 and the treated sewage emerging from nitrifying tank or the total oxidation tank 3 may be returned to the denitrifying tank. Also, where the wastewater treatment within the aeration tank 1 is for the purpose of removal of nitrogen, the treated sewage may be returned to the denitrifying tank. The flow for the removal of nitrogen is not specifically limited in the practice of the present invention and any known method can be employed such as, for example, the Wuhmann s method, in which the nitrifying tank and the denitrifying tank are arranged sequentially in this order and the Barnard's method, in which while the denitrifying tank and the nitrifying tank are arranged sequentially in this order, the sewage is returned from the nitrifying tank to the denitrifying tank and an organic matter such as methanol or the like is added as a source of nutrition for denitrifying bacteria. A combination of those methods may also be employed. By way of example, the sludge may be contacted with nitrifying bacteria within the nitrifying tank under an aerobic condition with the BOD sludge load being equal to or lower than 0.08 kg-BOD/Kg-MLSS per day and the nitrifying step at which the sludge is allowed to undergo self-oxidization and the total oxidizing step are carried out within one and the same tank.

The separating membrane that can be employed in the practice of the present invention may not be always limited to a specific shape, but may have any suitable shape selected from a hollow fiber membrane, a tubular membrane and a flat membrane, and where the hollow fiber membrane is employed, a relatively large membrane area per unitary capacity of the membrane can be obtained and a filtering device can be downsized.

Also, the separating membrane that can be employed in the practice of the present invention is not always limited to that made of a specific material, but the membrane made of, for example, an organic polymeric material such as, for example, polyolefin, polysulfone, polyethersulfone, ethylene-vinyl alcohol copolymer, polyacrylonitrile, cellulose acetate, polyvinylidene fluoride, polyperfluoroethylene, polyester methacrylate, polyester or polyamide, or the membrane made of an inorganic material such as, ceramics may be suitably employed in consideration of for example, the condition of use and the desired filtering performance. Specifically, the membrane made of a hydrophilic material such as a polysulfone resin hydrophilized with a polyvinyl alcohol resin, a polysulfone resin added with a hydrophilic polymer, a polyvinyl alcohol resin, a polyacrylonitrile resin, a cellulose acetate resin, or a polyethylene resin which has been hydrophilized is preferably employed since due to a high hydrophilic property sufficient to minimize adherence of SS components and to enhance separation of adhered SS components, but the hollow fiber membrane made of any other material may be also employed. Where the organic polymer material is used, it may be a copolymer of a plurality of polymers or a blended material consisting of a plurality of the materials may be employed.

Where the organic polymer material is used as a material for the separation membrane, a manufacturing method is not specifically limited to a particular one, but a method selected suitably from any known methods may be employed in consideration of the characteristics of the material and the desired shape and performance of the separation membrane to be used.

The pore size of the separation membrane that may be employed in the practice of the present invention is preferably not greater than 5 μm in consideration of the separating performance between the sludge and water. The pore size of the separation membrane within the range of 0.1 to 3 μm is more preferable. The pore size referred to hereinbefore and hereinafter is defined as a particle size of a particular reference material at which particle size 90% of the particles of the reference material is eliminated by filtering of the separation membrane. The reference material has a known particle size and may be selected from various materials such as, for example, colloidal silica, emulsion or latex. The pore size is preferably uniform over the separation membrane. In the case of an ultra filtration membrane, although the pore size cannot be determined based on the particle size of the reference material of a kind discussed above, but when similarly measured using protein having a known molecular weight, the ultra filtration membrane having a molecular weight cutoff greater than 3000 may be preferably employed.

In the practice of the present invention, the separation membrane is employed in a modularized form for filtration. Depending on the shape of the separation membrane, the filtering method, the filtering condition and the membrane cleansing method, any mode of modularization may be suitably selected, and a hollow fiber membrane module may be constructed by mounting one or a plurality of membrane elements. For example, for a membrane module utilizing the hollow fiber membranes, a membrane module in which several tens to some hundred thousands of hollow fiber membranes that are bundled together are bent to represent a generally U-shaped configuration and then accommodated within a module, a membrane module in which one end of the bundle of the hollow fibers is sealed by a suitable sealing member, a membrane module in which a bundle of hollow fibrous filaments are respectively sealed at one end by suitable sealing members in a state left not connected at one end together (in a free state), and a membrane module in which opposite ends of the bundle of hollow fibrous filaments are left open, may be employed. Also, the present invention is not intended to limit to a specific shape and the membrane module may represent, for example, a cylindrical shape or a screen-like shape.

While the filtering performance generally tends to be lowered as the separation membrane is clogged, the separation membrane can be regenerated when physically or chemically cleansed. The regenerating condition may be suitably selected depending on the material forming the separation membrane module, the shape thereof and/or the pore size of the separation membrane used. The physical cleansing method of the hollow fiber membrane module may include, for example, back washing of the membrane filter with water, back washing with gas, flushing, or air bubbling while the chemical cleansing method may include a method in which the separation filter is washed with acid such as hydrochloric acid, sulfuric acid, nitric acid, oxalic acid or citric acid, cleansing with alkaline such as, sodium hydrate, cleansing with an oxidizing agent such as sodium hypochlorite or hydrogen peroxide, or a cleansing with a chelating agent such as ethylene diamine tetra-acetic acid may be employed.

Figure 2:
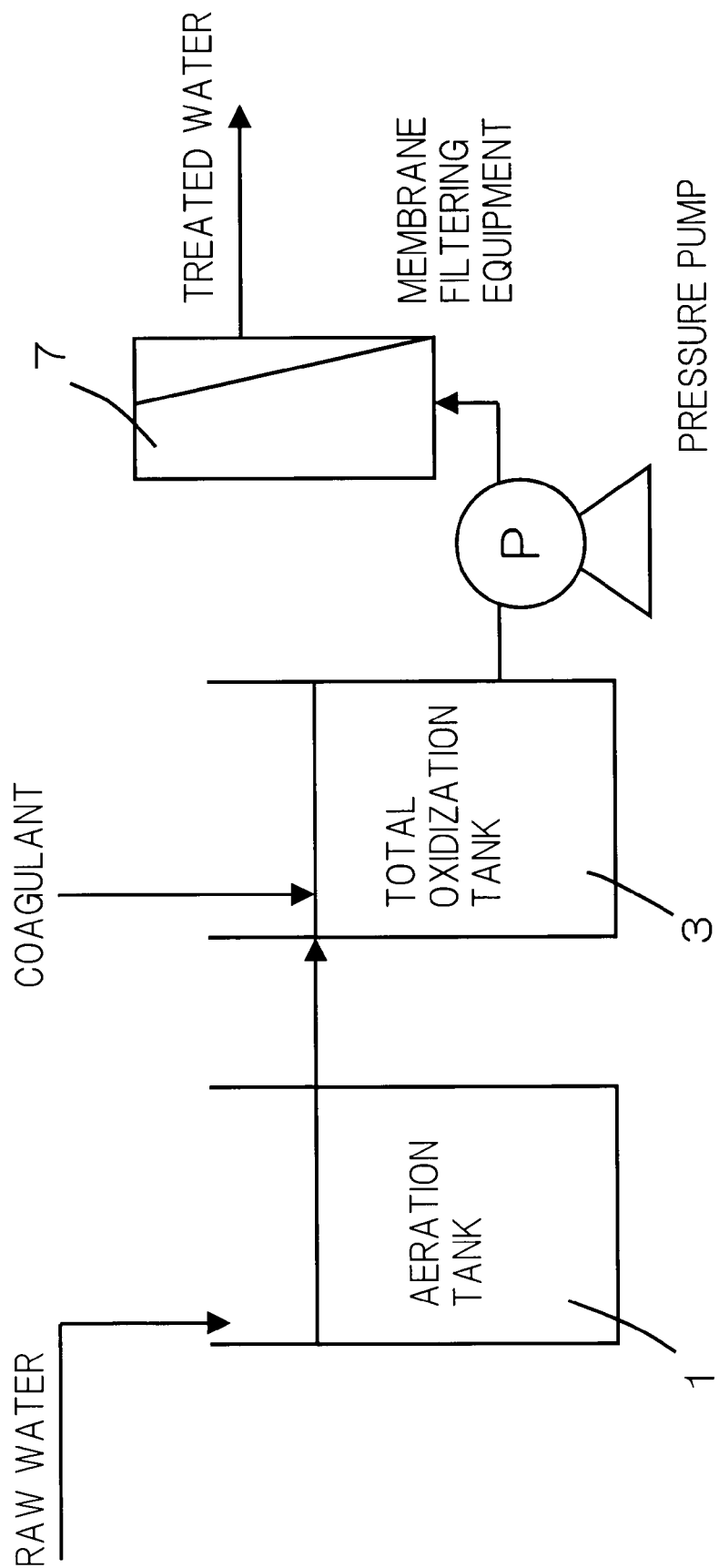
FIG. 2 illustrates an example of placement of a separation membrane when a solid-liquid separation equipment for a sludge within a total oxidization tank is employed in the form of the separation membrane.
Figure 3:
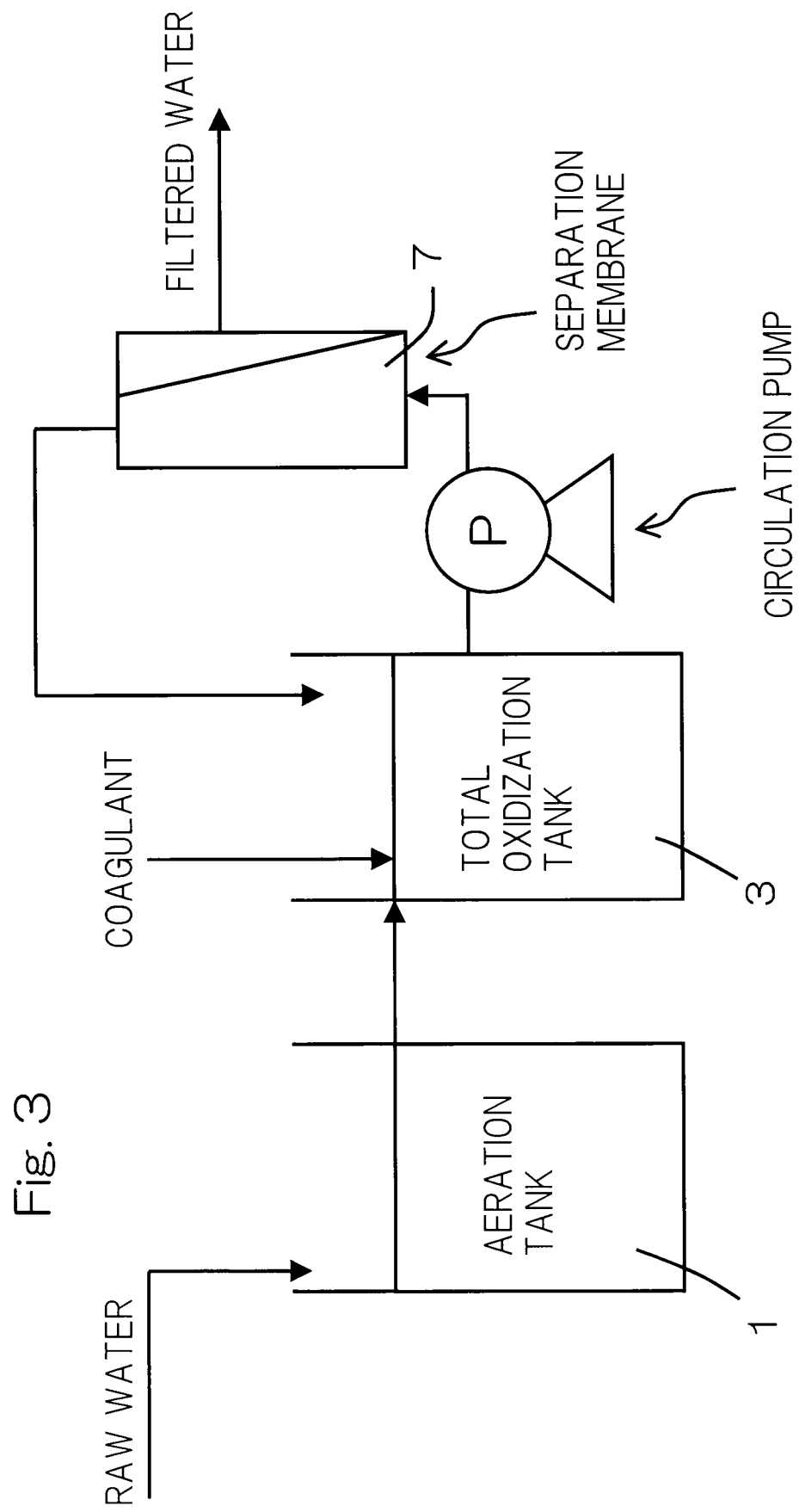
FIG. 3 illustrates an example of placement of the separation membrane when the solid-liquid separation equipment for the sludge within the total oxidization tank is employed in the form of the separation membrane.
Figure 4:
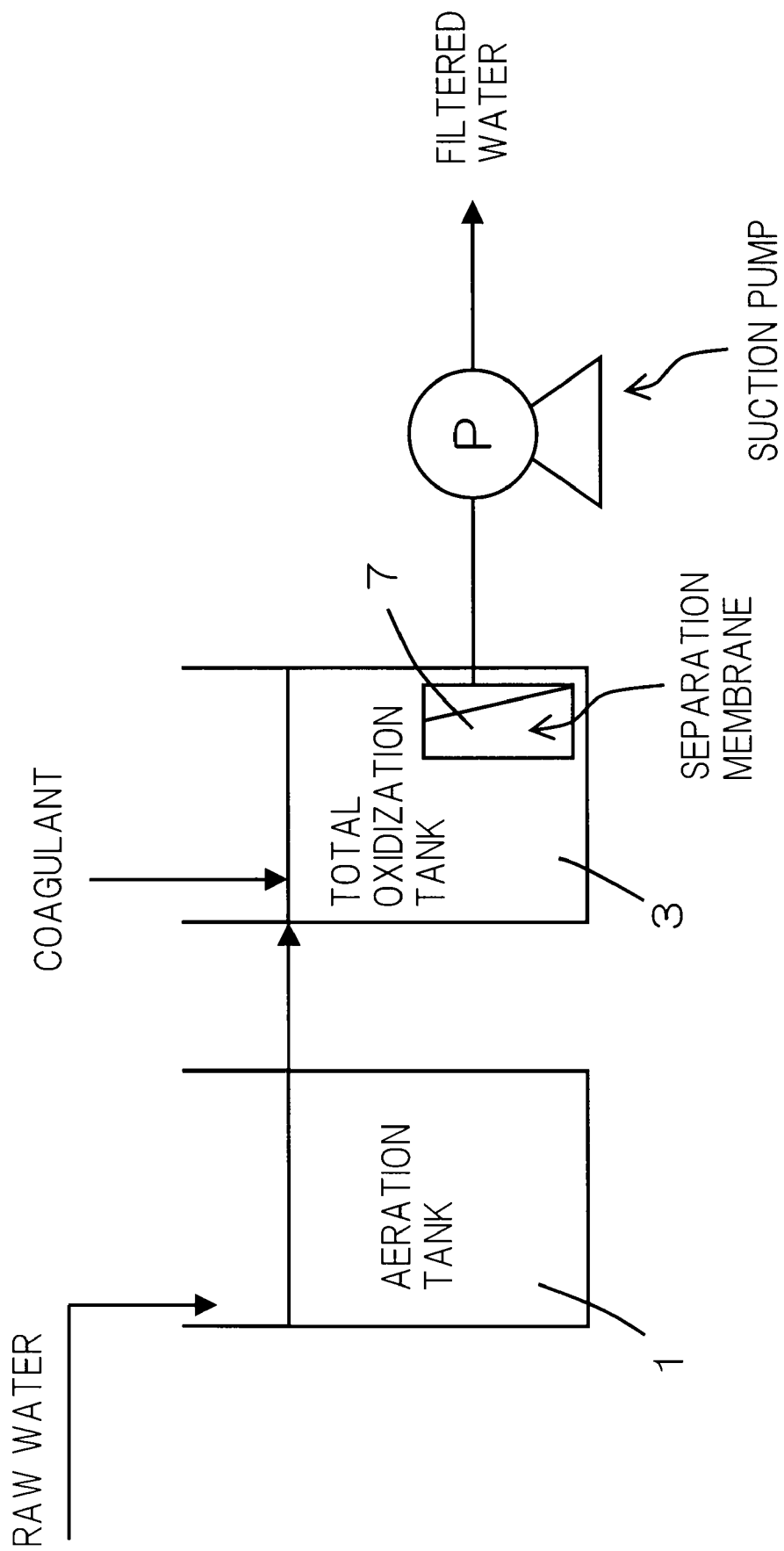
FIG. 4 is a diagram schematically showing the flow for removal of BOD employed in any one of Example 2 and Comparative Example 3 when the solid-liquid separation equipment for the sludge within the total oxidization tank is employed in the form of the separation membrane.

Example of placement of the separation membrane and construction of the membrane filtering apparatus, which can be employed in the practice of the present invention, are shown in FIGS. 2 to 4. The filtering system may be employed in the form of a system in which as shown in FIG. 2, the membrane module (membrane filtering device) 7 or the like including the separation membrane is disposed outside the total oxidization tank 3 and a raw water containing a sludge is supplied to the membrane module 7 or the like for total filtration, a system in which as shown in FIG. 3, the membrane module 7 or the like including the separation membrane is disposed outside the total oxidization tank 3 and a raw water containing a sludge is circulated so that a portion of the raw water can be filtered, and a system in which as shown in FIG. 4, the membrane module 7 or the like including the separation membrane is submerged within the total oxidization tank 3 and a raw water containing a sludge is sucked therethrough for filtration. Also, depending on the placement of the total oxidization tank 3 and the membrane module 7, the water head difference may be employed in place of a pressure pump or a suction pump. It is to be noted that the system shown in FIG. 3 has such advantages that the system can be operated at a high permeate flux and the separation membrane can have a small surface area, but has such a disadvantage that a large energy is required to circulate the raw water containing the sludge. On the other hand, the system shown in FIG. 4 has such advantages that the space for installation may be small and the energy can be small, but has such a disadvantage that the permeate flux is generally low enough to require a large membrane surface area. Also, where the system is employed in which the separation membrane is immersed within the total oxidization tank 3 and filtration is carried out by the utilization of a suction or a water head difference as shown in FIG. 4, the membrane module 7 or the like including the separation membrane is placed atop an air diffusing device so that membrane clogging can be suppressed by the utilization of an effect of cleansing the membrane surface with diffused air. A wastewater treating equipment may be newly installed for the purpose of the present invention, but any existing wastewater treating equipment may be renovated.

Owing to the present invention, the operation with a minimized amount of the excess sludge generated comes to be continued with a compact equipment.

Hereinafter, the present invention will be demonstrated by way of some examples. It is to be noted that the following physical parameters referred to in the following examples and comparative examples are measured according to specific evaluating methods referred to therein.

(BOD Removal Ratio)

Having measured the BOD of the raw water supplied into a test tank and a soluble BOD of drained water, the BOD removal ratio was calculated using the following equation:

$$BOD \text{ removal ratio} = \{(\text{Raw Water } BOD) - (\text{Soluble } BOD \text{ of Discharged Water})\}/(\text{Raw Water } BOD) \times 100 \qquad (SS)$$

After the volume of the discharged water has been measured, the wastewater was filtered through a 0.45 μm filter and was then dried. The weight of the filter before treatment was subtracted from the weight of the dried filter to provide the weight of a solid component and was then divided by the volume of the discharged water, for conversion into the concentration.

(Sludge Transformation Ratio)

The sludge transformation ratio is calculated from the BOD quantity, treated within the test tank, and the quantity of SS generated within the test tank.

$$\text{Sludge transformation ratio (\%)} = (SS \text{ Quantity})/(BOD \text{ Quantity Removed}) \times 100$$

(Sludge Withdrawal Quantity)

The dry weight of the quantity of the sludge withdrawn is described.

EXAMPLE 1

(Preparatory Experiment)

100 ml of a gel carrier of acetalized polyvinyl alcohol having a pore size of not greater than 20 μm was supplied into a test tank of 1000 ml in capacity and chemical wastewater A was supplied into the test tank in such a quantity that the BOD volume load of 3.5 kg/(m$^3$ per day) can be established. From the SS concentration within the wastewater measured at the time the BOD removal ratio in the test tank attained 95% or higher, the sludge transformation ratio of 10% was obtained. Thereafter, the SS was filled in a graduated cylinder of 1 L in capacity and the coefficient of self-oxidization was subsequently determined in reference to a time-dependent change of the sludge concentration under an aerobic condition. The coefficient of self-oxidization so measured was found to be 0.082 (per day).

(Verification Experiment)

In accordance with the flow shown in FIG. 1 and based on the sludge transformation ratio and the coefficient of self-oxidization both determined according to the preparatory experiment referred to above, an experiment to treat the chemical wastewater A of 400 m$^3$ per day was conducted with the use of a wastewater treatment equipment including the aeration tank 1 having a capacity of 230 m$^3$, the total oxidization tank 3 having a capacity of 100 m$^3$ and the sedimentation tank 5 having a capacity of 50 m$^3$. The gel carrier of acetalized polyvinyl alcohol having a pore size of not greater than 20 μm was charged in a quantity of 23 m$^3$ into the aeration tank 1. Polychlorinated aluminum (an inorganic coagulant) was added to the total oxidization tank 3 to the extent that the solid-liquid separability of the sludge within the sedimentation tank 5 was improved. When the system was operated at 3.5 g/(m$^3$ per day) of the BOD volume load within the aeration tank 1, the MLSS within the total oxidization tank 3 increased gradually, and then attained at a substantially constant value of about 10000 mg/L. The sludge transformation ratio in the aeration tank 1 was found to be 10%. Also, the coefficient of self-oxidization, derived from the quantity of the sludge flowing into the total oxidization tank 3 and the quantity of the sludge reduced within the total oxidization tank 3 at the time the MLSS within the total oxidization tank 3, was found to be 0.080, which is substantially identical with the result of the preparatory experiment. The coagulant was continuously supplied into the total oxidization tank 3 for about one month subsequent to the start of the operation. After that, the system was operated for ten months under the condition that the coagulant is added when the treated water SS has subsequently attained 10 mg/L or larger. During that experiment period, the coagulant was not required to be additionally added after the first one month.

Also, the system could be operated with no sludge withdrawn during the experiment period and the treated water was found to have an acceptable quality of BOD=5 mg/L or smaller and SS=10 mg/L or smaller.

COMPARATIVE EXAMPLE 1

(Preparatory Experiment)

100 ml of a gel carrier of acetalized polyvinyl alcohol having a pore size of not greater than 20 μm was supplied into a test tank of 1000 ml in capacity and chemical wastewater A was supplied into the test tank in such a quantity that the BOD volume load of 2.5 kg/($m^3$ per day) can be established. From the SS concentration within the wastewater measured at the time the BOD removal ratio in the test tank attained 95% or higher, the sludge transformation ratio of 10% was obtained. Thereafter, the SS was filled in a graduated cylinder of 1 L in capacity and the coefficient of self-oxidization was subsequently determined in reference to a time-dependent change of the sludge concentration under an aerobic condition. The coefficient of self-oxidization so measured was found to be 0.034 (per day).

(Verification Experiment)

In accordance with the flow shown in FIG. 1 and based on the sludge transformation ratio and the coefficient of self-oxidization both determined according to the preparatory experiment referred to above, an experiment to treat the chemical wastewater A of 400 $m^3$ per day was conducted with the use of a wastewater treatment equipment including the aeration tank 1 having a capacity of 320 $m^3$, the total oxidization tank 3 having a capacity of 100 $m^3$ and the sedimentation tank 5 having a capacity of 50 $m^3$. The gel carrier of acetalized polyvinyl alcohol having a pore size of not greater than 20 μm was charged in a quantity of 32 $m^3$ into the aeration tank 1. Polychlorinated aluminum (an inorganic coagulant) was added to the total oxidization tank 3 to the extent that the solid-liquid separability of the sludge within the sedimentation tank 5 was improved. When the system was operated at 2.5 g/($m^3$ per day) of the BOD volume load within the aeration tank 1, the sludge transformation ratio in the aeration tank 1 was found to be 10%. The MLSS within the total oxidization tank 3 increased gradually and attained at a substantially constant value of about 10000 mg/L, but the interface of the sludge within the sedimentation tank 5 increased day by day and withdrawal of the sludge in a quantity of about 47 kg per day was needed. The coefficient of self-oxidization, derived from the quantity of the sludge generated within the total oxidization tank 3 and the quantity of the sludge withdrawn, was found to be 0.033 (per day).

COMPARATIVE EXAMPLE 2

(Verification Experiment)

In accordance with the flow shown in FIG. 1 and based on the sludge transformation ratio and the coefficient of self-oxidization both determined according to the preparatory experiment under Comparative Example 1 referred to above, an experiment to treat the chemical wastewater A of 400 $m^3$ per day was conducted with the use of a wastewater treatment equipment including the aeration tank 1 having a capacity of 320 $m^3$, the total oxidization tank 3 having a capacity of 240 $m^3$ and the sedimentation tank 5 having a capacity of 50 $m^3$. The gel carrier of acetalized polyvinyl alcohol having a pore size of not greater than 20 μm was charged in a quantity of 32 $m^3$ into the aeration tank 1. Polychlorinated aluminum (an inorganic coagulant) was added to the total oxidization tank 3 to the extent that the solid-liquid separability of the sludge within the sedimentation tank 5 was improved. When the system was operated at 2.5 g/($m^3$ per day) of the BOD volume load within the aeration tank 1, the MLSS within the total oxidization tank 3 increased gradually and attained at a substantially constant value of about 10000 mg/L. The sludge transformation ratio in the aeration tank 1 was found to be 10%. The coefficient of self-oxidization, derived from the quantity of the sludge flowing into the total oxidization tank 3 and the quantity of the sludge reduced within the total oxidization tank 3 at the time the MLSS within the total oxidization tank 3, was found to be 0.033 (per day), which is substantially identical with the result of the preparatory experiment. The coagulant was continuously supplied into the total oxidization tank 3 for about one month subsequent to the start of the operation. After that, the system was operated for ten months under the condition that the coagulant is added when the treated water SS has subsequently attained 10 mg/L or larger. During that experiment period, the coagulant was not required to be additionally added after the first one month. Also, the system could be operated with no sludge withdrawn during the experiment period and the treated water was found to have an acceptable quality of BOD=5 mg/L or smaller and SS=10 mg/L or smaller.

In both of Experiment 1 and Comparative Example 1, the treatment was conducted on the same wastewater in the similar manner, except that the aeration tanks of different capacities were employed and the volume of the carrier was changed for the purpose of rendering the volume ratio of the carrier relative to the aeration tank 1 employed in Example 1 to remain the same so that the BOD volume load was changed. As a result, with the BOD volume load in Comparative Example 1, the coefficient of self-oxidization was small and, accordingly, the withdrawal of the sludge was needed when the total oxidization tank of the same capacity as that of the total oxidization tank 3 used in Example 1.In order to eliminate the need to withdraw the sludge under this condition, the use of the total oxidization tank 3 having a capacity twice or more the capacity of the total oxidization tank 3 used in Example 1 is required and, hence, it has become clear that in accordance with the wastewater treatment method of the present invention, the wastewater can be treated with the apparatus of a smaller capacity.

EXAMPLE 2

(Preparatory Experiment)

100 ml of a gel carrier of acetalized polyvinyl alcohol having a pore size of not greater than 20 μm was supplied into a test tank of 1000 ml in capacity and chemical wastewater B was supplied into the test tank in such a quantity that the BOD volume load of 2.5 kg/($m^3$ per day) can be established. From the SS concentration exhibited when the BOD removal ratio within the tank attained 95% or higher, the sludge transformation ratio of 30% was obtained. Thereafter, the SS was filled in a graduated cylinder of 1 L in capacity and the coefficient of self-oxidization subsequently determined in reference to a time-dependent change of the sludge concentration under an aerobic condition was found to be 0.070 (per day).

(Verification Experiment)

In accordance with the flow shown in FIG. 4 and based on the sludge transformation ratio and the coefficient of self-oxidization both determined according to the preparatory experiment referred to above, an experiment to treat the chemical wastewater B of 400 m$^3$ per day was conducted with the use of a wastewater treatment equipment including the aeration tank 1 having a capacity of 320 m$^3$, the total oxidization tank 3 having a capacity of 300 m$^3$ and the membrane filtering equipment. The gel carrier of acetalized polyvinyl alcohol having a pore size of not greater than 20 μm was charged in a quantity of 32 m$^3$ into the aeration tank 1. Polychlorinated aluminum (an inorganic coagulant) was added to the total oxidization tank 3 to the extent that the solid-liquid separability of the sludge within the sedimentation tank 5 was improved. The membrane filtering device was operated according to a suction filtering system, in which a hollow fiber membrane module 7 having a pore size of 0.4 μm was immersed within the total oxidization 3 and aeration was carried out for constant cleansing of the membrane. When the system was operated at 2.5 g/(m$^3$ per day) of the BOD volume load within the aeration tank 1, the MLSS within the total oxidization tank 3 increased gradually, and then attained at a substantially constant value of about 11000 mg/L. The sludge transformation ratio in the aeration tank 1 was found to be 30%. Also, the coefficient of self-oxidization, derived from the quantity of the sludge flowing into the total oxidization tank 3 and the quantity of the sludge reduced within the total oxidization tank 3 at the time the MLSS within the total oxidization tank 3, was found to be 0.073, which is substantially identical with the result of the preparatory experiment. The coagulant was continuously supplied into the total oxidization tank 3 for about one month subsequent to the start of the operation and was then operated for six months with no coagulant added. During that experiment period, the coagulant was not required to be additionally added after the first one month. Also, the system could be operated with no sludge withdrawn during the experiment period and the treated water was found to have an acceptable quality of BOD=5 mg/L or smaller and SS=0 mg/L.

COMPARATIVE EXAMPLE 3

(Preparatory Experiment)

100 ml of a gel carrier of acetalized polyvinyl alcohol having a pore size of not greater than 100 μm was supplied into a test tank of 1000 ml in capacity and chemical wastewater B was supplied into the test tank in such a quantity that the BOD volume load of 2.5 kg/(m$^3$ per day) can be established. From the SS concentration within the wastewater measured at the time the BOD removal ratio in the test tank attained 95% or higher, the sludge transformation ratio of 30% was obtained. Thereafter, the SS was filled in a graduated cylinder of 1 L in capacity and the coefficient of self-oxidization was subsequently determined in reference to a time-dependent change of the sludge concentration under an aerobic condition. The coefficient of self-oxidization so measured was found to be 0.025 (per day).

(Verification Experiment)

In accordance with the flow shown in FIG. 4 and based on the sludge transformation ratio and the coefficient of self-oxidization both determined according to the preparatory experiment referred to above, an experiment to treat the chemical wastewater B of 400 m$^3$ per day was conducted with the use of the same wastewater treatment equipment as used in Example 2. The gel carrier of acetalized polyvinyl alcohol having a pore size of not greater than 100 μm was charged in a quantity of 32 m$^3$ into the aeration tank 1. Polychlorinated aluminum (an inorganic coagulant) was added to the total oxidization tank 3 to the extent that the solid-liquid separability of the sludge within the sedimentation tank 5 was improved. The membrane filtering device was operated according to a suction filtering system, in which a hollow fiber membrane module 7 having a pore size of 0.4 μm was immersed within the total oxidization 3 and aeration was carried out for constant cleansing of the membrane. When the system was operated at 2.5 g/(m$^3$ per day) of the BOD volume load within the aeration tank 1, the sludge transformation ratio in the aeration tank 1 was found to be 30%. The MLSS within the total oxidization tank 3 was set to about 11000 mg/L as is the case with that in Example 2. In order for the system to be operated under the MLSS of 11000 mg/L, the sludge within the total oxidization tank 3 was needed to be withdrawn in a quantity of about 155 kg per day. When the coefficient of self-oxidization is determined from the quantity of the sludge generated within the total oxidization tank 3 and the quantity of the sludge withdrawn, the coefficient of self-oxidization was found to be 0.026 (per day).

EXAMPLE 3

(Preparatory Experiment)

100 ml of a gel carrier of acetalized polyvinyl alcohol having a pore size of not greater than 20 μm was supplied into a test tank of 1000 ml in capacity and artificial wastewater was supplied into the test tank in such a quantity that the BOD volume load of 1.2 kg/(m$^3$ per day) can be established. From the SS concentration exhibited when the BOD removal ratio within the tank attained 95% or higher, the sludge transformation ratio of 30% was obtained. Thereafter, the SS was filled in a graduated cylinder of 1 L in capacity and when the coefficient of self-oxidization subsequently determined in reference to a time-dependent change of the sludge concentration under an aerobic condition, the coefficient of self-oxidization was found to be 0.070 (per day).

(Verification Experiment)

Figure 5:
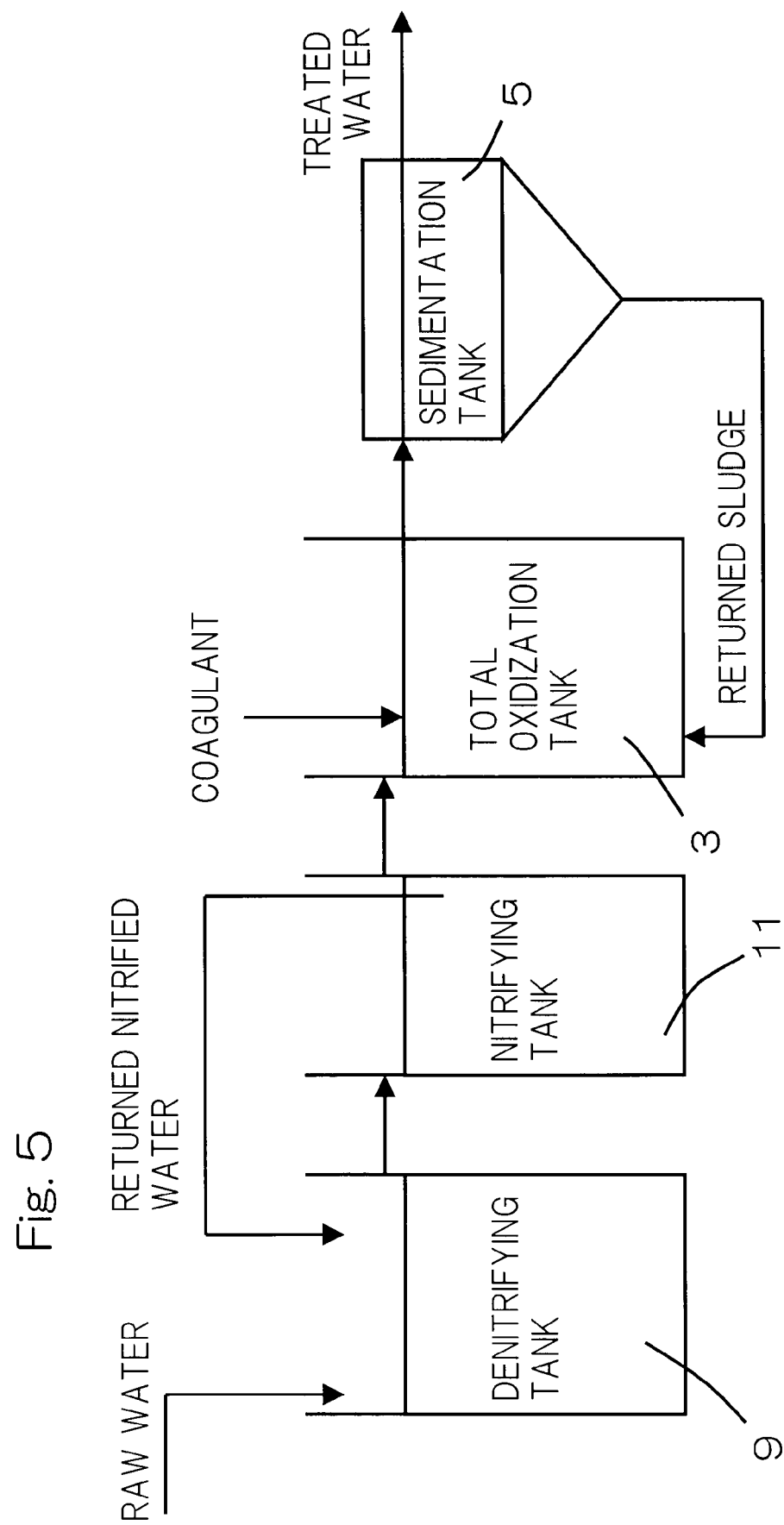
FIG. 5 is a diagram schematically showing the flow for removal of BOD and a nitrogen component employed in any one of Example 3 and Comparative Example 4.

In accordance with the flow shown in FIG. 5 and based on the sludge transformation ratio and the coefficient of self-oxidization both determined according to the preparatory experiment referred to above, an experiment to treat the artificial wastewater of 1200 L per day was conducted with the use of a wastewater treatment equipment including the denitrifying tank 9 having a capacity of 200 L, the nitrifying tank 11 having a capacity of 200 L, the total oxidization tank 3 having a capacity of 200 L and the sedimentation tank 5 having a capacity of 150. The artificial wastewater was prepared to have a BOD of 200 mg/L and total nitrogen of 50 mg/L. 20 of the gel carrier of acetalized polyvinyl alcohol having a pore size of not greater than 20 μm was charged into each of the denitrifying tank 9 and the nitrifying tank 11. A liquid within the nitrifying tank 11 was returned to the denitrifying tank 9 at a rate of 3600 per day. 230 g of polychlorinated aluminum (an inorganic coagulant) was initially added to the total oxidization tank 3. As a result of the system being operated under the condition referred to above, a nitrogen removal ratio in the denitrifying tank 9 and the nitrifying tank 11 attained a target value of up to 75% in a month subsequent to the start of operation. The MLSS in the total oxidization tank 3 increased gradually, having attained at a constant value of about 5200 mg/L. The sludge transformation ratio in the denitrifying tank 9 and the nitrifying tank 11 was found to be 30%. Also, the coefficient of self-oxidization, derived from the quantity of the sludge flowing into the total oxidization tank 3 and the quantity of the sludge reduced within the total oxidization tank 3 at the time the MLSS within the total oxidization tank 3, was found to be 0.069 per day, which is substantially identical with the result of the preparatory experiment. The coagulant was supplied into the total oxidization tank 3 only at the time of start of the operation and the system was operated for the subsequent ten months with no coagulant added. The system could be operated with no sludge withdrawn during the experiment period and the treated water was found to have an acceptable quality of BOD=5 mg/L or smaller and SS=10 mg/L or smaller.

COMPARATIVE EXAMPLE 4

(Preparatory Example)

100 ml of a gel carrier of acetalized polyvinyl alcohol having a pore size of not greater than 20 μm was supplied into a test tank of 1000 ml in capacity and artificial wastewater was supplied into the test tank in such a quantity that the BOD volume load of 1.2 kg/($m^3$ per day) can be established. From the SS concentration exhibited when the BOD removal ratio within the tank attained 95% or higher, the sludge transformation ratio of 30% was obtained. Thereafter, the SS was filled in a graduated cylinder of 1 in capacity and when the coefficient of self-oxidization subsequently determined in reference to a time-dependent change of the sludge concentration under an aerobic condition, the coefficient of self-oxidization was found to be 0.030 (per day).

(Verification Experiment)

In accordance with the flow shown in FIG. 5 and based on the sludge transformation ratio and the coefficient of self-oxidization both determined according to the preparatory experiment referred to above, an experiment to treat the artificial wastewater of 1200 per day was conducted with the use of a wastewater treatment equipment similar to that employed in Example 3. The artificial wastewater was prepared to have a BOD of 200 mg/L and total nitrogen of 50 mg/L. 20 of the gel carrier of acetalized polyvinyl alcohol having a pore size of not greater than 100 μm was charged into each of the denitrifying tank 9 and the nitrifying tank 11. A liquid within the nitrifying tank 11 was returned to the denitrifying tank 9 at a rate of 3600 per day. 230 g of polychlorinated aluminum (an inorganic coagulant) was initially added to the total oxidization tank 3. As a result of the system having been operated under the condition referred to above, the nitrogen removal rate in the denitrifying tank 9 and the nitrifying tank 11 attained a target value of 75% in a month subsequent to the start of operation. The sludge transformation ratio in the nitrifying tank 11 was found to be 15%. The MLSS in the total oxidization tank 3 increased gradually, having attained at a constant value of about 5200 mg/L, and the interface of the sludge within the sedimentation tank 5 increased day by day and withdrawal of the sludge in a quantity of about 40 g per day was needed. Also, when the coefficient of self-oxidization was measured from the quantity of the sludge generated within the total oxidization tank 3 and the quantity of the sludge withdrawn, the coefficient of self-oxidization was found to be 0.031 (per day).

EXAMPLE 4

(Preparatory Experiment)

100 ml of a gel carrier of acetalized polyvinyl alcohol having a pore size of not greater than 20 μm was supplied into a test tank of 1000 ml in capacity and food wastewater A was supplied into the test tank in such a quantity that the BOD volume load of 3.0 kg/($m^3$ per day) can be established. From the SS concentration exhibited when the BOD removal ratio within the tank attained 95% or higher, the sludge transformation ratio of 40% was obtained. Thereafter, the SS was filled in a graduated cylinder of 1 in capacity and when the coefficient of self-oxidization subsequently determined in reference to a time-dependent change of the sludge concentration under an aerobic condition, the coefficient of self-oxidization was found to be 0.069 (per day).

(Verification Experiment)

In accordance with the flow shown in FIG. 1 and based on the sludge transformation ratio and the coefficient of self-oxidization both determined according to the preparatory experiment referred to above, an experiment to treat the food wastewater of 200 $m^3$ per day was conducted with the use of a wastewater treatment equipment including the aeration tank 1 having a capacity of 70 $m^3$, the total oxidization tank 3 having a capacity of 190 $m^3$ and the sedimentation tank 5 having a capacity of 25 $m^3$. 7 $m^3$ of the gel carrier of acetalized polyvinyl alcohol having a pore size of not greater than 20 μm was charged into the aerating tank 1. Polychlorinated aluminum (an inorganic coagulant) was added to the total oxidization tank 3 to the extent that the solid-liquid separability of the sludge within the sedimentation tank 5 was improved. When the system was operated at 3.0 kg/($m^3$ per day) of the BOD volume load within the aeration tank 1, the MLSS within the total oxidization tank 3 increased gradually and attained at a substantially constant value of about 6000 mg/L. The sludge transformation ratio in the aeration tank 1 was found to be 40%. The coefficient of self-oxidization, derived from the quantity of the sludge flowing into the total oxidization tank 3 and the quantity of the sludge reduced within the total oxidization tank 3 at the time the MLSS within the total oxidization tank 3, was found to be 0.070 (per day), which is substantially identical with the result of the preparatory experiment. The coagulant was continuously supplied into the total oxidization tank 3 for about one month subsequent to the start of the operation. After that, the system was operated for ten months under the condition that the coagulant is added when the treated water SS has subsequently attained 10 mg/L or larger. During that experiment period, the coagulant was added only for the initial one month and was not added thereafter. Also, the system could be operated with no sludge withdrawn during the experiment period and the treated water was found to have an acceptable quality of BOD=5 mg/L or smaller and SS=10 mg/L or smaller.

COMPARATIVE EXAMPLE 5

(Preparatory Experiment)

100 ml of a gel carrier of acetalized polyvinyl alcohol having a pore size of not greater than 100 μm was supplied into a test tank of 1000 ml in capacity and food wastewater A was supplied into the test tank in such a quantity that the BOD volume load of 3.0 kg/($m^3$ per day) can be established. From the SS concentration exhibited when the BOD removal ratio within the tank attained 95% or higher, the sludge transformation ratio of 40% was obtained. Thereafter, the SS was filled in a graduated cylinder of 1 L in capacity and when the coefficient of self-oxidization subsequently determined in reference to a time-dependent change of the sludge concentration under an aerobic condition, the coefficient of self-oxidization was found to be 0.024 (per day).

(Verification Experiment)

In accordance with the flow shown in FIG. 1 and based on the sludge transformation ratio and the coefficient of self-oxidization both determined according to the preparatory experiment referred to above, an experiment to treat the food wastewater of 200 m³ per day was conducted with the use of a wastewater treatment equipment similar to that employed in Example 4. 7 m³ of the gel carrier of acetalized polyvinyl alcohol having a pore size of not greater than 100 μm was charged into the aeration tank 1. Polychlorinated aluminum (an inorganic coagulant) was added to the total oxidization tank 3 to the extent that the solid-liquid separability of the sludge within the sedimentation tank 5 was improved. When the system had been operated at 3.0 kg/(m³ per day) of the BOD volume load within the aeration tank 1, the sludge transformation ratio in the aeration tank 1 was found to be 40%. The MLSS in the total oxidization tank 3 increased gradually, having attained at a constant value of about 6000 mg/L, but the interface of the sludge within the sedimentation tank 5 increased day by day and withdrawal of the sludge in a quantity of about 50 kg per day was needed. When the coefficient of self-oxidization was measured from the quantity of the sludge generated within the total oxidization tank 3 and the quantity of the sludge withdrawn, the coefficient of self-oxidization was found to be 0.025 (per day).

EXAMPLE 5

(Preparatory Experiment)

100 ml of a gel carrier of acetalized polyvinyl alcohol having a pore size of not greater than 20 μm was supplied into a test tank of 1000 ml in capacity and chemical wastewater C was supplied into the test tank in such a quantity that the BOD volume load of 2.5 kg/(m³ per day) can be established. From the SS concentration exhibited when the BOD removal ratio within the tank attained 95% or higher, the sludge transformation ratio of 30% was obtained. Thereafter, the SS was filled in a graduated cylinder of 1 in capacity and when the coefficient of self-oxidization subsequently determined in reference to a time-dependent change of the sludge concentration under an aerobic condition, the coefficient of self-oxidization was found to be 0.069 (per day).

(Verification Experiment)

In accordance with the flow shown in FIG. 1 and based on the sludge transformation ratio and the coefficient of self-oxidization both determined according to the preparatory experiment referred to above, an experiment to treat the chemical wastewater C of 400 m³ per day was conducted with the use of a wastewater treatment equipment including the aeration tank 1 having a capacity of 320 m³, the total oxidization tank 3 having a capacity of 570 m³ and the sedimentation tank 5 having a capacity of 50 m³. 32 m³ of the gel carrier of acetalized polyvinyl alcohol having a pore size of not greater than 20 μm was charged into the aeration tank 1. Polychlorinated aluminum (an inorganic coagulant) was added to the total oxidization tank 3 to the extent that the solid-liquid separability of the sludge within the sedimentation tank 5 was improved. When the system had been operated at 2.5 kg/(m³ per day) of the BOD volume load within the aeration tank 1, the MLSS in the total oxidization tank 3 increased gradually, having attained at a constant value of about 6000 mg/L. The sludge transformation ratio in the aeration tank 1 was found to be 30%. When the coefficient of self-oxidization was measured from the quantity of the sludge generated within the total oxidization tank 3 and the quantity of the sludge withdrawn at the time the MLSS within the total oxidization tank 3 attained the constant value, the coefficient of self-oxidization was found to be 0.070 (per day), which was identical with that obtained during the preparatory experiment. The coagulant was continuously supplied into the total oxidization tank 3 for about one month subsequent to the start of the operation. After that, the system was operated for twelve months under the condition that the coagulant is added when the treated water SS has subsequently attained 10 mg/L or larger. During that experiment period, the coagulant was added only for the initial one month and was not added thereafter. Also, the system could be operated with no sludge withdrawn during the experiment period and the treated water was found to have an acceptable quality of BOD=5 mg/L or smaller and SS=10 mg/L or smaller.

COMPARATIVE EXAMPLE 6

(Preparatory Experiment)

100 ml of a gel carrier of acetalized polyvinyl alcohol having a pore size of not greater than 100 μm was supplied into a test tank of 1000 ml in capacity and chemical wastewater C was supplied into the test tank in such a quantity that the BOD volume load of 2.5 kg/(m³ per day) can be established. From the SS concentration exhibited when the BOD removal ratio within the tank attained 95% or higher, the sludge transformation ratio of 30% was obtained. Thereafter, the SS was filled in a graduated cylinder of 1 in capacity and when the coefficient of self-oxidization subsequently determined in reference to a time-dependent change of the sludge concentration under an aerobic condition, the coefficient of self-oxidization was found to be 0.033 (per day).

(Verification Experiment)

In accordance with the flow shown in FIG. 1 and based on the sludge transformation ratio and the coefficient of self-oxidization both determined according to the preparatory experiment referred to above, an experiment to treat the chemical wastewater C of 400 m³ per day was conducted with the use of a wastewater treatment equipment similar to that employed in Example 5. 32 m³ of the gel carrier of acetalized polyvinyl alcohol having a pore size of not greater than 100 μm was charged into the aeration tank 1. Polychlorinated aluminum (an inorganic coagulant) was added to the total oxidization tank 3 to the extent that the solid-liquid separability of the sludge within the sedimentation tank 5 was improved. When the system had been operated at 2.5 kg/(m³ per day) of the BOD volume load within the aeration tank 1, the sludge transformation ratio in the aeration tank 1 was found to be 30%. The MLSS in the total oxidization tank 3 increased gradually, having attained at a constant value of about 6000 mg/L, but the interface of the sludge within the sedimentation tank 5 increased day by day and withdrawal of the sludge in a quantity of about 127 kg per day was needed. When the coefficient of self-oxidization was measured from the quantity of the sludge generated within the total oxidization tank 3 and the quantity of the sludge withdrawn, the coefficient of self-oxidization was found to be 0.033 (per day).

EXAMPLE 6

(Preparatory Experiment)

100 ml of a gel carrier of acetalized polyvinyl alcohol having a pore size of not greater than 100 μm was supplied into a test tank of 1000 ml in capacity and food wastewater B was supplied into the test tank in such a quantity that the BOD volume load of 5 kg/(m³ per day) can be established. From the SS concentration exhibited when the BOD removal ratio within the tank attained 95% or higher, the sludge transformation ratio of 30% was obtained. Thereafter, the SS was filled in a graduated cylinder of 1 in capacity and when the coefficient of self-oxidization subsequently determined in reference to a time-dependent change of the sludge concentration under an aerobic condition, the coefficient of self-oxidization was found to be 0.055 (per day).

(Verification Experiment)

In accordance with the flow shown in FIG. 1 and based on the sludge transformation ratio and the coefficient of self-oxidization both determined according to the preparatory experiment referred to above, an experiment to treat the food wastewater B of 400 m³ per day was conducted with the use of a wastewater treatment equipment including the aeration tank 1 having a capacity of 160 m³, the total oxidization tank 3 having a capacity of 700 m³ and the sedimentation tank 5 having a capacity of 50 m³. 16 m³ of the gel carrier of acetalized polyvinyl alcohol having a pore size of not greater than 100 µm was charged into the aeration tank 1. Polychlorinated aluminum (an inorganic coagulant) was added to the total oxidization tank 3 to the extent that the solid-liquid separability of the sludge within the sedimentation tank 5 was improved. When the system had been operated at 5 kg/(m³ per day) of the BOD volume load within the aeration tank 1, the MLSS in the total oxidization tank 3 increased gradually, having attained at a constant value of about 6000 mg/L. The sludge transformation ratio in the aeration tank 1 was found to be 30%. When the coefficient of self-oxidization, measured from the quantity of the sludge flowing into the total oxidization tank 3 and the quantity of the sludge reduced within the total oxidization tank 3 at the time the MLSS within the total oxidization tank 3, was found to be 0.057 (per day), which was substantially identical with that obtained during the preparatory experiment. The coagulant was continuously supplied into the total oxidization tank 3 for about one month subsequent to the start of the operation. After that, the system was operated for twelve months under the condition that the coagulant is added when the treated water SS has subsequently attained 10 mg/L or larger. During that experiment period, the coagulant was added only for the initial one month and was not added thereafter. Also, the system could be operated with no sludge withdrawn during the experiment period and the treated water was found to have an acceptable quality of BOD=5 mg/L or smaller and SS=10 mg/L or smaller.

COMPARATIVE EXAMPLE 7

(Preparatory Experiment)

100 ml of a gel carrier of acetalized polyvinyl alcohol having a pore size of not greater than 100 µm was supplied into a test tank of 1000 ml in capacity and food wastewater B was supplied into the test tank in such a quantity that the BOD volume load of 2.0 kg/(m³ per day) can be established. From the SS concentration exhibited when the BOD removal ratio within the tank attained 95% or higher, the sludge transformation ratio of 30% was obtained. Thereafter, the SS was filled in a graduated cylinder of 1 in capacity and when the coefficient of self-oxidization subsequently determined in reference to a time-dependent change of the sludge concentration under an aerobic condition, the coefficient of self-oxidization was found to be 0.020 (per day).

(Verification Experiment)

In accordance with the flow shown in FIG. 1 and based on the sludge transformation ratio and the coefficient of self-oxidization both determined according to the preparatory experiment referred to above, an experiment to treat the food wastewater B of 400 m³ per day was conducted with the use of a wastewater treatment equipment including the aeration tank 1 having a capacity of 400 m³, the total oxidization tank 3 having a capacity of 700 m³ and the sedimentation tank 5 having a capacity of 50 m³. 40 m³ of the gel carrier of acetalized polyvinyl alcohol having a pore size of not greater than 100 µm was charged into the aeration tank 1. Polychlorinated aluminum (an inorganic coagulant) was added to the total oxidization tank 3 to the extent that the solid-liquid separability of the sludge within the sedimentation tank 5 was improved. When the system had been operated at 2.0 kg/(m³ per day) of the BOD volume load within the aeration tank 1, the sludge transformation ratio in the aeration tank 1 was found to be 30%. The MLSS in the total oxidization tank 3 increased gradually, having attained at a constant value of about 6000 mg/L, and the interface of the sludge within the sedimentation tank 5 increased day by day and withdrawal of the sludge in a quantity of about 150 kg per day was needed. When the coefficient of self-oxidization was measured from the quantity of the sludge generated within the total oxidization tank 3 and the quantity of the sludge withdrawn, the coefficient of self-oxidization was found to be 0.021 (per day).

What is claimed is:

1. A wastewater treatment method performed with the use of an aeration tank in which wastewater is contacted with a particulate carrier under an aerobic condition, a total oxidization tank in which the volume of a sludge developed within the aeration tank is reduced, and a solid-liquid separation equipment for the sludge within the total oxidization tank, which method comprises steps of:
    setting a coefficient of self-oxidization of the sludge flowing into the total oxidization tank to 0.05 (per day) or larger; and
    adding a coagulant to the total oxidization tank to improve a solid-liquid separability of the sludge within the total oxidization tank.

2. The wastewater treatment method as claimed in claim 1, wherein wastewater treatment in the aeration tank is conducted for removal of BOD or removal of nitrogen.

3. The wastewater treatment method as claimed in claim 1, wherein a BOD sludge load within the total oxidization tank is set to 0.05 kg–BOD/(kg–SS per day) or smaller.

4. The wastewater treatment method as claimed in claim 1, wherein the solid-liquid separation equipment for the sludge within the total oxidization tank is in the form of a sedimentation tank or a filtering equipment.

5. The wastewater treatment method as claimed in claim 1, wherein the carrier is at least one carrier selected from the group consisting of a gel carrier, a plastic carrier and a fibrous carrier.

6. The wastewater treatment method as claimed in claim 5, wherein the carrier is an acetalized polyvinyl alcohol gel.

* * * * *